United States Patent
Batchu et al.

(10) Patent No.: US 9,420,633 B2
(45) Date of Patent: *Aug. 16, 2016

(54) QUAD SIM FUNCTIONALITY FOR A DUAL ACTIVE MOBILE DEVICE

(71) Applicant: QUALCOMM Incorporated, San Diego, CA (US)

(72) Inventors: Bhaskara Viswanadham Batchu, Medak (IN); Aditya Kailash Bohra, Gujarat (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 13/897,392

(22) Filed: May 18, 2013

(65) Prior Publication Data

US 2014/0342776 A1    Nov. 20, 2014

(51) Int. Cl.
*H04B 1/38*    (2015.01)
*H04W 88/06*    (2009.01)
(Continued)

(52) U.S. Cl.
CPC .......... *H04W 88/06* (2013.01); *H04W 52/0274* (2013.01); *H04W 60/005* (2013.01); *H04W 68/02* (2013.01); *H04W 76/048* (2013.01); *H04W 52/0229* (2013.01); *H04W 76/046* (2013.01)

(58) Field of Classification Search
CPC ..... H04W 88/06; H04W 68/02; H04B 1/3816
USPC .............................. 455/558, 450, 552.1, 448
See application file for complete search history.

(56) References Cited

U.S. PATENT DOCUMENTS 8,849,350 B1 * 9/2014 Batchu .............. H04W 52/0216
455/558
2010/0279698 A1 * 11/2010 Wong .................... H04W 88/06
455/450

(Continued)

FOREIGN PATENT DOCUMENTS

CN    201967137 U    9/2011

OTHER PUBLICATIONS

International Search Report and Written Opinion—PCT/US2014/038631—ISA/EPO—Nov. 13, 2014.

(Continued)

*Primary Examiner* — Md Talukder
(74) *Attorney, Agent, or Firm* — The Marbury Law Group, PLLC

(57) ABSTRACT

Methods, systems and devices are provided for managing quad SIM functionality on a mobile device. The method includes maintaining a first subscription and a second subscription active in slotted idle states on a first RF chain on the mobile device. The first subscription being associated with a first SIM and the second subscription being associated with a second SIM. The method also includes maintaining a third subscription and a fourth subscription active in slotted idle states on a second RF chain on the mobile device. The third subscription being associated with a third SIM and the fourth subscription being associated with a fourth SIM. In the slotted idle states the first, second, third and fourth subscriptions are able to monitor pages in respective paging channel slots. Further, the method includes switching the third subscription to the first RF chain in response to the fourth subscription entering a dedicated traffic state.

8 Claims, 8 Drawing Sheets

(51) Int. Cl.
    *H04W 68/02*     (2009.01)
    *H04W 60/00*     (2009.01)
    *H04W 52/02*     (2009.01)
    *H04W 76/04*     (2009.01)

(56) References Cited

U.S. PATENT DOCUMENTS

| | | | |
|---|---|---|---|
| 2011/0077031 A1* | 3/2011 | Kim | H04B 1/3816 |
| | | | 455/458 |
| 2011/0235587 A1 | 9/2011 | Zhang et al. | |
| 2011/0237297 A1* | 9/2011 | Shin | H04W 76/02 |
| | | | 455/558 |
| 2012/0115545 A1* | 5/2012 | Middleton | H04M 1/72563 |
| | | | 455/558 |
| 2012/0231802 A1 | 9/2012 | Ngai | |
| 2013/0005394 A1* | 1/2013 | Geary | H04W 52/028 |
| | | | 455/552.1 |
| 2013/0072256 A1* | 3/2013 | Su | H04W 52/0274 |
| | | | 455/558 |
| 2014/0342776 A1* | 11/2014 | Viswanadham | H04W 60/005 |
| | | | 455/558 |

OTHER PUBLICATIONS

Partial International Search Report—PCT/US2014/038631—ISA/EPO—Sep. 24, 2014.

* cited by examiner

QUAD SIM FUNCTIONALITY FOR A DUAL ACTIVE MOBILE DEVICE

FIELD

The present application relates to managing functionality on a mobile communication device, and more particularly to handling quad SIM subscriptions of a dual active mobile communication device.

BACKGROUND

Mobile communication devices, such as cellular telephones, transmit and/or receive data using various protocols to communicate remotely. Other portable devices such as laptop computers, tablet computers, portable game consoles and even watches may also include components that receive and transmit data, which makes them further examples of communication devices that are mobile. Such mobile communication devices generally include a subscriber identity/identification module (SIM) card, which is an integrated circuit used to store codes that identify and authenticate subscribers across mobile communication networks.

A "subscription" may include services to which the subscriber by way of a mobile device has access. For example, a telephone number and the communications using that number are part of a subscription accessed using a SIM card. Subscriptions may use various communication standards, such as long term evolution (LTE), global system for mobile communications (GSM), general packet radio service (GPRS), enhanced data rates for GSM evolution (EDGE), universal mobile telecommunications system (UMTS), generic radio access network (GRAN), evolution-data optimized (1x/DO), and wideband code division multiple access (WCDMA) and code division multiple access (CDMA) to communicate across mobile communication networks.

Some mobile devices may include more than one SIM card in order to maintain more than one subscription. For example, dual SIM mobile devices include two SIM cards and quad SIM mobile devices include four SIM Cards. In this way, a single mobile device may use different telephone numbers and maintain separate bills. Also, by using multiple SIM cards a user my keep business subscriptions separate from personal subscriptions, take advantage of different pricing/service plans or have an additional SIM card specific to a another country or region.

While having multiple SIM cards in one device has its advantages, dual SIM devices consume more power than their single SIM counterparts, and quad SIM devices tend to consume significantly more power than dual SIM devices, which reduces their performance and is generally undesirable. Configuring dual SIM mobile devices to have two SIM cards that use a common radio frequency (RF) circuit (referred to as an "RF chain") to communicate reduces the number of transceivers to one, which may save power. Similarly, Quad-SIM devices may have just two RF chains to support the four SIM cards (i.e., enable wireless communications via the subscriptions supported by each of the SIM cards). However, such configurations mean that one of the SIM cards must enter an out-of-service state when the other SIM card enters a dedicated traffic state in which the subscription associated with that SIM card is engaged in supporting communications over the single RF chain of the mobile device.

SUMMARY

The various embodiments described herein include methods of managing quad SIM functionality on a mobile device. An embodiment method may include maintaining a first subscription and a second subscription active in slotted idle states on a first RF chain of the mobile device, and maintaining a third subscription and a fourth subscription active in slotted idle states on a second RF chain of the mobile device. For purposes of nomenclature, the first subscription is associated with a first SIM and the second subscription is associated with a second SIM, the third subscription is associated with a third SIM, and the fourth subscription is associated with a fourth SIM. The slotted idle states enabling the first, second, third and fourth subscriptions to monitor pages in their respective paging channel slots. The method may include switching the third subscription to the first RF chain in response to the fourth subscription entering a dedicated traffic state.

An embodiment method may include detecting a first communication protocol used as part of a first subscription of the first SIM on the quad SIM mobile device and detecting a second communication protocol used as part of the second subscription of a second SIM on the quad SIM mobile device. The method may include maintaining the first SIM and the second SIM active in slotted idle states on a first RF chain on the quad SIM mobile device in response to the first communication protocol substantially matching the second communication protocol. Also, the method may include maintaining a third subscription of a third SIM and a fourth subscription of a fourth SIM active in slotted idle states on a second RF chain on the quad SIM mobile device, in which the idle states the first, second, third and fourth subscriptions are able to monitor pages in respective paging channel slots.

Further embodiments may include a computing device having a processor configured with processor-executable software instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
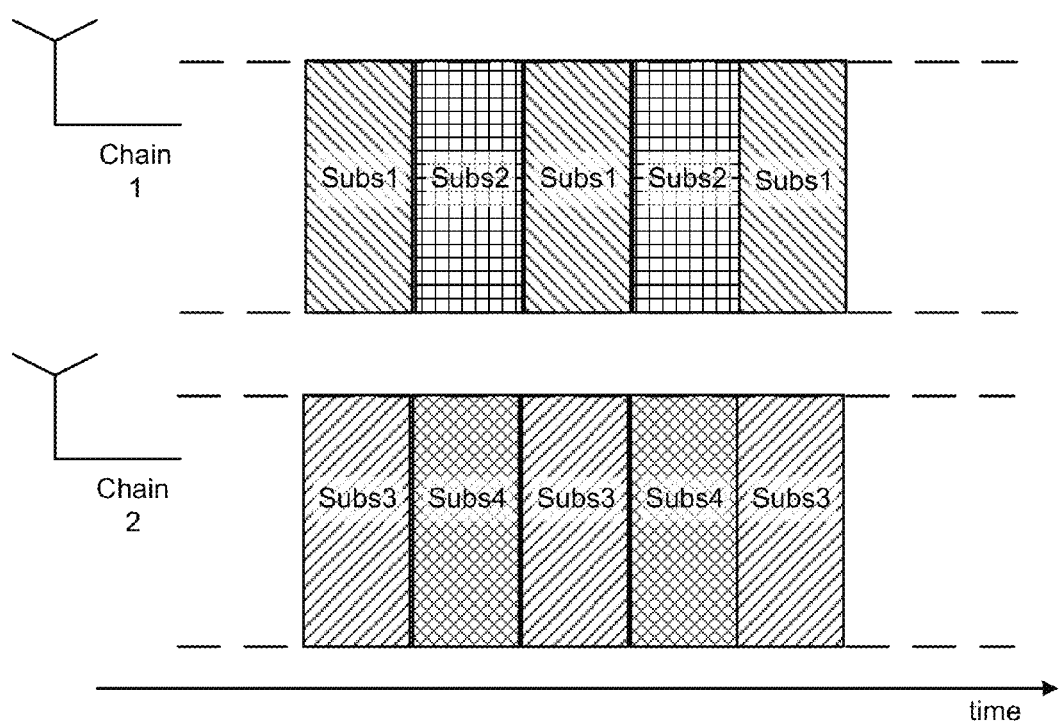
FIG. 1 is a sequence architecture diagram illustrating the operation of two RF chains, suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any implementation described herein as "exemplary" is not necessarily to be construed as preferred or advantageous over other implementations. Additionally, use of the words, "first," "second," "third," "primary," "secondary," "tertiary" or similar verbiage is intended herein for clarity purposes to distinguish various described elements and is not intended to limit the invention to a particular order or hierarchy of elements.

Also, as used herein the term "RF chain" refers to the sequence of circuit elements, including a transmitter and/or receiver (or a transceiver), along which a wireless signal may be transmitted and/or received. The RF chain may include transmitters, receivers, conductive elements, amplifiers, attenuators, measurements instruments, loads, wires, cables and more. Also, such circuit elements in an RF chain may be combined and share common circuitry or a single housing, such as in a single mobile communication modem chip or circuit board.

The terms "mobile communication device" and "mobile device" are used interchangeably herein to refer to any one or all of cellular telephones, smartphones, personal or mobile multi-media players, personal data assistants (PDA's), laptop computers, tablet computers, netbooks, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in data-only mobile devices, such as cell phones, tablets and laptops that have limited battery life, the embodiments are generally useful in any computing device that may be used to access wireless IP and data services through cellular communication networks.

The various embodiments manage hardware usage for efficient quad SIM functionality in a mobile communication device, which may translate into improved mobile terminal call performance across multiple subscriptions. In an embodiment, a quad-SIM mobile device includes two RF chains supporting the four SIM cards. At least two subscriptions at a time may operate on one RF chain, such as two subscriptions in dual SIM dual standby (DSDS) mode. DSDS mode is a slotted idle state that allows each of the two subscriptions on that one RF chain to monitor pages in their respective paging channel slots. In this way, two subscriptions may remain active in an idle state on a single RF chain. Also, a mobile communication device with two RF chains may thus maintain four subscriptions active using this technique for pairs of SIM cards; each chain maintaining two subscriptions active in an idle state monitor pages in their respective paging channel slots. When monitoring pages in a paging channel slot, the mobile communication device wakes-up from a sleep and actively reads page messages, if received from a base station. Also, the mobile communication device may reply by sending back a message, if appropriate. Such monitoring (including reading and replying) is generally referred to as a slotted idle state. In a slotted idle state, the device wakes up, checks whether a page is received and goes back to sleep if there is no page received. In an active slotted idle state, the device will regularly wake up from a temporary sleep to monitor the page and return to sleep, which process is then repeated after another period of sleep. In contrast, in a non-slotted state, the device does not go to sleep and monitors for pages continuously.

FIG. 1 illustrates a sequence architecture diagram of two RF chains of a quad SIM mobile communication device. The RF chains enabling dual active operation to receive-transmit data in accordance with an embodiment. In this way, two subscriptions are maintained on each of the RF chains across a period of time. One RF chain, indicated as RF chain 1, carries Subscription 1 (Subs1) and Subscription 2 (Subs2) in slotted idle states. In this way, Subs1 and Subs2 on RF chain 1 alternate in reading pages of their respective subscriptions. Subs1 is associated with a first SIM and Subs2 is associated with a second SIM. Similarly the other RF chain, indicated as RF chain 2, carries Subscription 3 (Subs3) and Subscription 4 (Subs4) in slotted idle states. Subs3 is associated with a third SIM and Subs4 is associated with a fourth SIM. In each slotted idle state, the subscriptions are able to monitor pages in their respective paging channel slots. RF chain 1 and RF chain 2 may achieve this configuration by supporting a dual standby dual SIM mode of operation.

Figure 2:
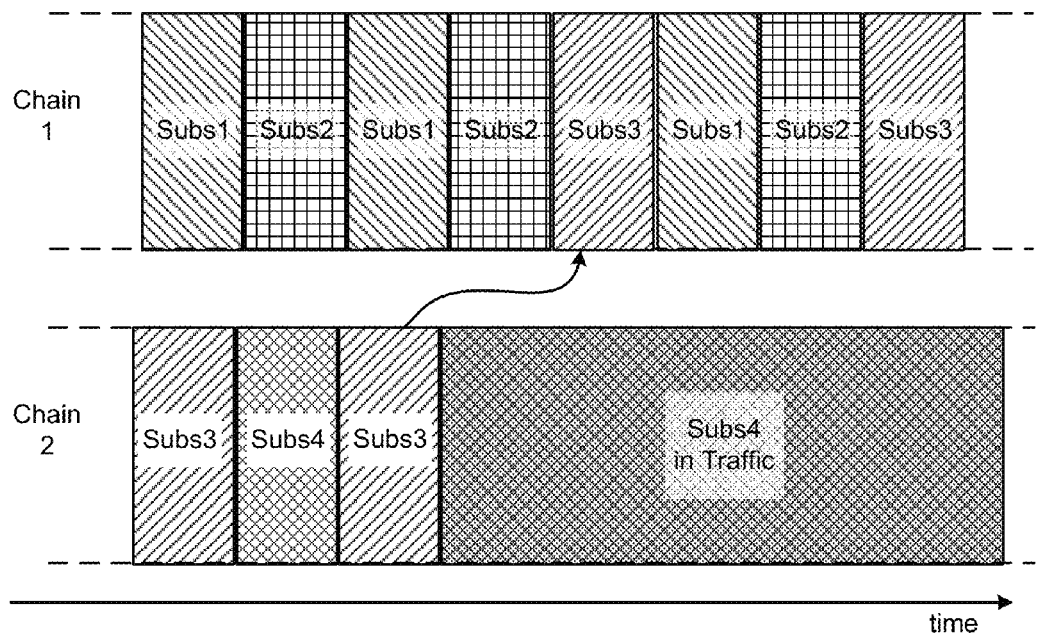
FIG. 2 is another sequence architecture diagram illustrating the operation of two RF chains with a subscription entering a traffic state, suitable for use in the various embodiments.
Figure 3:
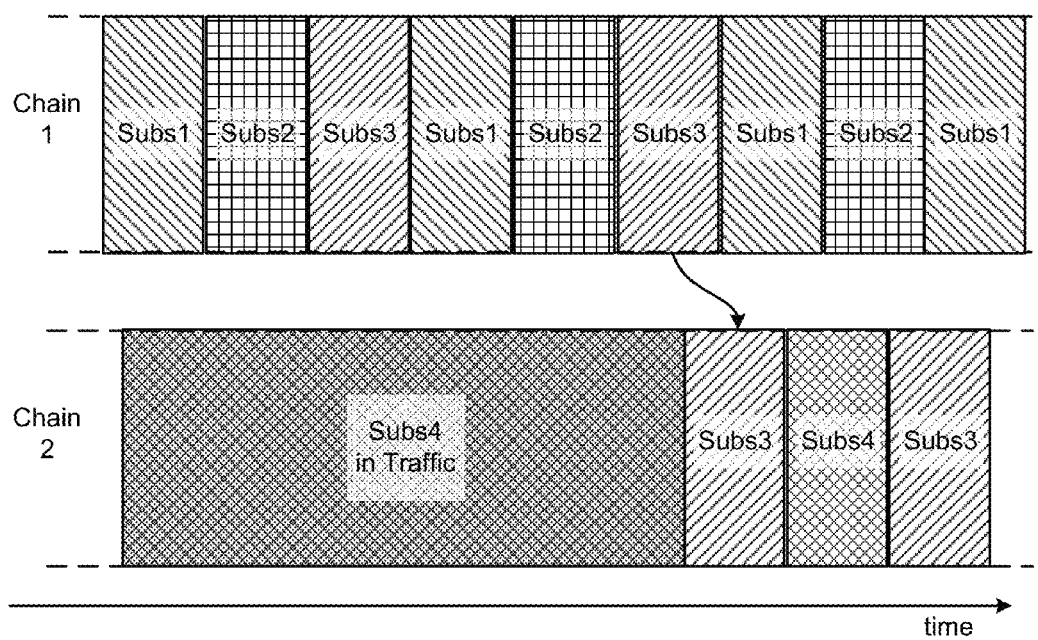
FIG. 3 is a further sequence architecture diagram illustrating the operation of two RF chains with a subscription exiting a traffic state, suitable for use in the various embodiments.

In an embodiment, two or three of the four subscriptions that all in an idle state may use a single one of the RF chains to monitor pages in their respective paging channel slots. This leaves the other RF chain for maintaining the remaining subscription(s). FIGS. 2 and 3 illustrate a sequence architecture diagram of two RF chains of a quad SIM mobile communication device in accordance with this embodiment. In particular, FIG. 2 shows that at an early point along the time line (starting from the left side in the configuration shown), RF chain 1 and RF chain 2 each maintain two subscriptions (RF chain 1 maintaining Subs1 and Subs2; RF chain 2 maintaining Subs3 and Subs 4). As time progresses and Subs4 goes into a dedicated traffic state, Subs3 is switched from RF chain 2 to RF chain 1. Also, Subs1 and Subs2 remain active on RF chain 1 when Subs3 is switched to RF chain 1. Examples of a dedicated traffic state include when a subscription handles voice traffic and may apply to data traffic as well. FIG. 3 shows that once Subs4 leaves the dedicated traffic state, the third subscription may be switched back to RF chain 2.

Figure 4:
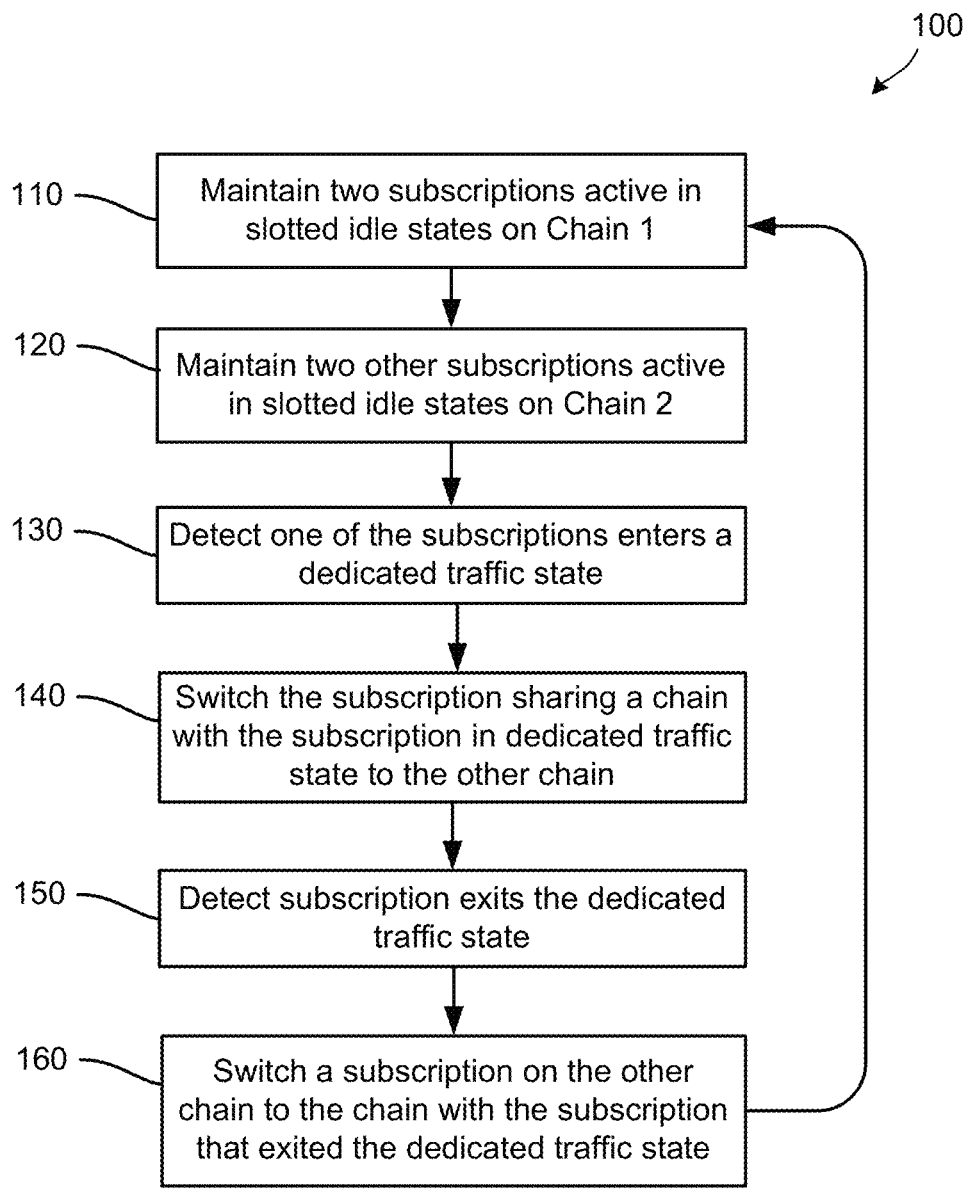
FIG. 4 is a process flow diagram illustrating an embodiment method of managing quad SIM functionality on a mobile device in accordance with an embodiment.

FIG. 4 illustrates a method 100 of managing quad SIM functionality on a mobile device in accordance with an embodiment. In block 110 two subscriptions are maintained active in slotted idle states on RF chain 1. Each of these two subscriptions being associated with a different SIM card, such as first and second SIM cards. In block 120 two other subscriptions are maintained active in slotted idle states on RF chain 2. Each of these two other subscriptions being associated with yet further different SIM cards, such as third and fourth SIM cards. In block 130 one of the subscriptions is detected as entering a dedicated traffic state. For example, one of the four SIM cards in the quad SIM device carries voice traffic. In block 140 the subscription sharing a chain with the subscription detected in block 130 as being in dedicated traffic state may be switched to the other RF chain. For example, if a subscription on RF chain 1 is detected as entering a dedicated traffic state, then the other subscription on RF chain 1 would be switched to RF chain 2. In block 150 a subscription may be detected to have exited the dedicated traffic state, such as returning to an idle state. For example, this may be the subscription previously detected in block 130 as having entered a dedicated traffic state. With one RF chain carrying a subscription not in a dedicated traffic state, in block 160 one of the subscriptions on the other RF chain may be switched to that one RF chain. For example, this could be the subscription switched in block 140 or it could be one of the other subscriptions maintained on that other RF chain. Thereafter, the method may repeat the process by reverting to block 110.

In a further embodiment, power consumption may be mitigated in a mobile communication device by grouping subscriptions using similar technologies. This embodiment recognizes that when one of the RF chains carries subscriptions using different operating protocols (e.g., one SIM using CDMA and another SIM using GSM, both operating on a common RF chain), then hardware and software overheads may get very large, which may lead to huge power dissipation and time loss on chains maintaining such disparate technologies. This occurs, at least in part, because switching between subscriptions using different protocols when slotted mode operations are being performed involves overheads, such as the following:

RF Enter: Time/resources used to tune to a particular technology (e.g., CDMA, GSM, etc.);
RF Exit: Time/resources used to reset the settings;
RF Tune: Time/resources used to fine tune ("warm up") to a particular frequency; and
MDSP Enable: Time/resources used to flush out and reload the firmware image when switching to a SIM with a different technology.

Figure 5:
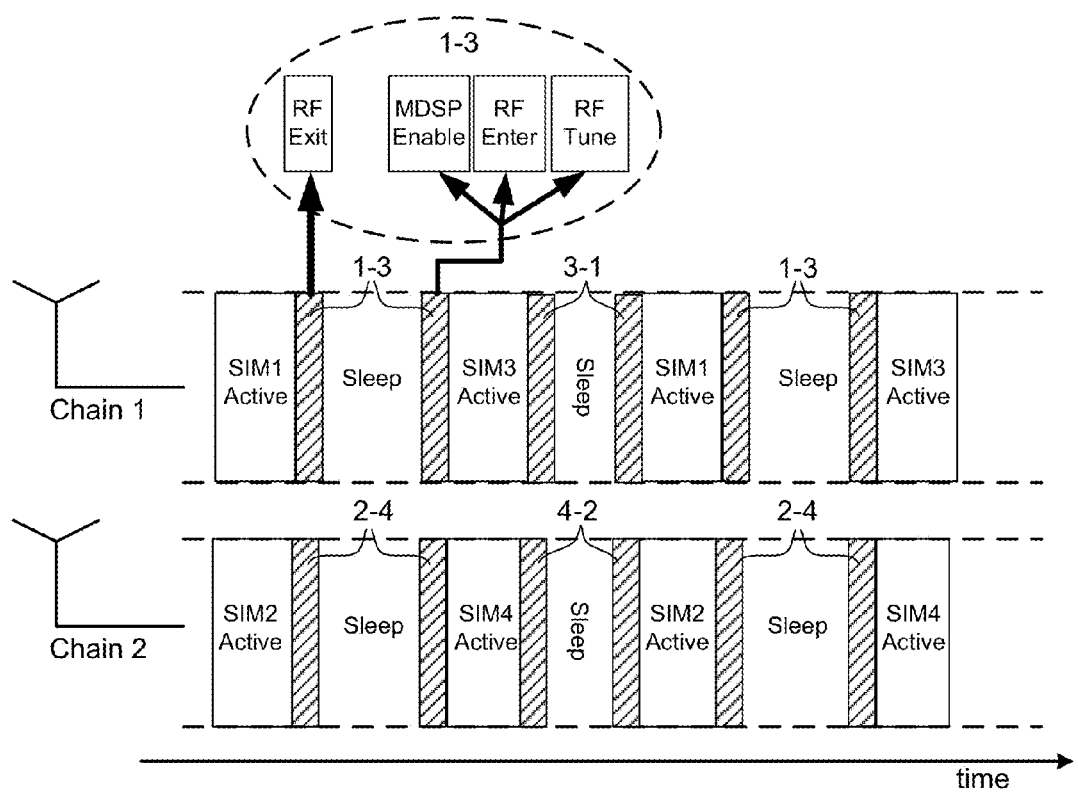
FIG. 5 is a sequence architecture diagram illustrating overhead costs associated with the operation of two RF chains, suitable for use in the various embodiments.

FIG. 5 illustrates the power consumption associated with switching between SIMs using different protocols. Two RF chains of a quad SIM mobile communication device are illustrated operating with two subscriptions carried on each of the RF chains. One RF chain, indicated as RF chain 1, carries subscriptions associated with two SIMs, indicated as SIM1 and SIM2. The subscriptions are active in slotted idle states, which allow SIM1 and SIM3 to be periodically active on the same chain by alternating when they are active. Similarly the other RF chain, indicated as RF chain 2, carries subscriptions associated with two SIMs, indicated as SIM2 and SIM4, active in slotted idle states. Examples of the overhead costs associated with deactivating a SIM and activating another SIM are indicated as 1-3, 3-1, 2-4 and 4-2 respectively. Also, a relief representation is illustrated within a dotted-line ellipse, showing an exemplary breakdown of overhead 1-3 associated with the deactivation of SIM 1 and the activation of SIM 3. In particular, the overhead 1-3 includes RF exit, MDSP Enable, RF Enter and RF Tune. Between the active states and overhead transitions to and from those states, there are periods of inactivity indicated as a "Sleep" state for the RF chain. The other overheads 3-1, 2-4 and 4-2 shown in FIG. 5 may include the same or similar expenditures. These overhead expenditures are generally involved in each switch between SIMs. However, when the switch between SIMs requires a change from one protocol to another (i.e., different technologies) the overhead cost may be higher.

Figure 6:
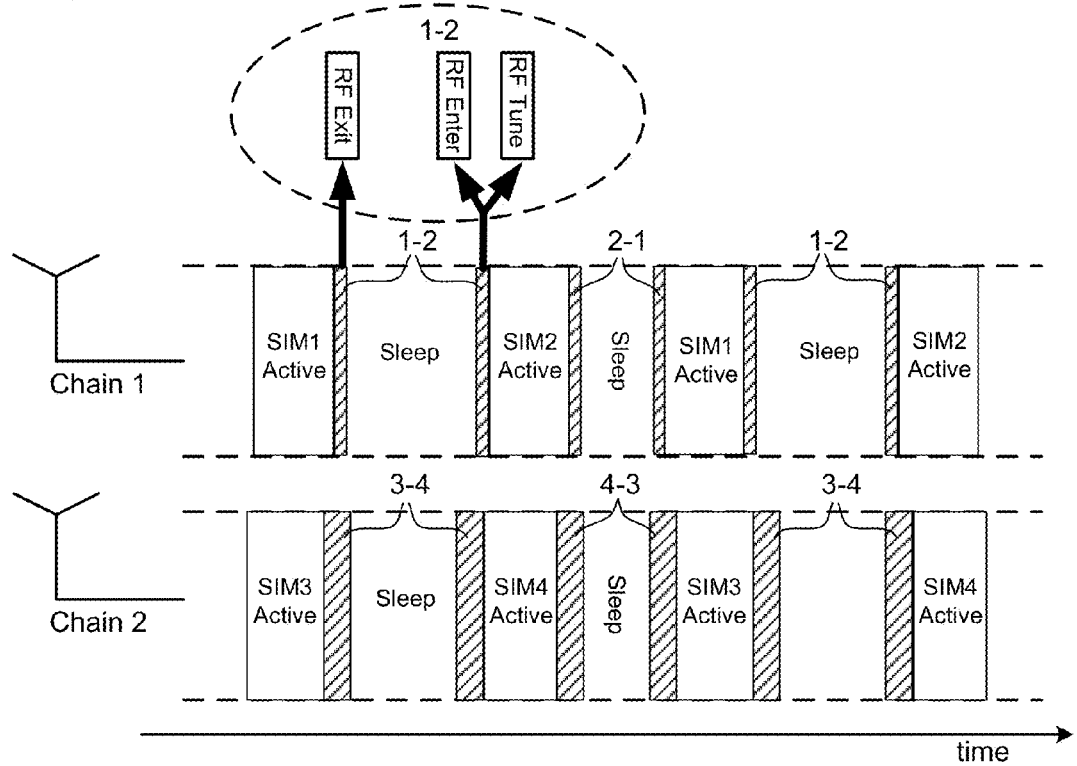
FIG. 6 is a sequence architecture diagram illustrating reduced overhead costs associated with the operation of two RF chains, suitable for use in the various embodiments.

In an embodiment, the overhead costs associated with a quad SIM mobile device may be reduced, particularly if that device unnecessarily switches between SIMs using different technologies on a single RF chain. This type of switching may account for some unnecessary power consumption. In this embodiment SIMs using similar communication protocols may be grouped together in order to reduce unnecessary overhead costs. To illustrate this, FIG. 6 shows two RF chains of a quad SIM mobile device. As shown, a first subscription associated with a first SIM (SIM1) and a second subscription associated with a second SIM (SIM2) are maintained active in idle states on RF chain 1 of the mobile device. The SIM1 subscription is grouped with the SIM2 subscription according to this embodiment because SIM1 protocol matches, or at least substantially matches, the SIM2 protocol. This grouping of two SIMs on one RF chain applies to any two protocols that match. In this way, two SIM's that support or run on the same radio access technology will be said to "match" protocols. For example, two SIM's using GSM match; however, if one SIM uses CDMA and the other SIM uses LTE the SIMS do not match. Two protocols that are not identical but very similar to one another, such as LTE and a modified LTE, may still "substantially match." A substantial match may be found when two protocols, if grouped together, reduce overhead costs more than grouping either of those two protocols with one of the other protocols operating on the other two SIMs. Thus, an identical match (or simply a "match" where the two protocols are exactly the same) is considered a substantial match, although a substantial match may not necessarily be an identical match.

Once two of the SIMs are matched and grouped on one RF chain, the third subscription associated with the third SIM (SIM3) and the fourth subscription associated with the fourth SIM (SIM4) may be maintained active in idle states on RF chain 2 of the mobile device. While further cost benefits would be achieved if SIM3 and SIM4 also match technologies, cost savings may be achieved even if they do not match when at least the two other SIMs have matched technologies. When two SIMs that use the same communication protocols share an RF chain, the RF Exit and RF Enter may be completed faster. Also, even the RF Tuning may be accomplished more quickly.

A relief representation is included in FIG. 6, illustrated as a dotted-line ellipse, showing an exemplary breakdown of overhead 1-2 associated with the deactivation of SIM 1 and the activation of SIM 2, where these two SIMs use the same communication protocols. The overhead 1-3 includes RF exit, RF Enter and RF Tune, which are represented as more narrow boxes to reflect their reduced overhead cost. Also, it should be noted that overhead 1-3 does not include a switching of the MDSP firmware image. In this illustrative example, SIM3 and SIM4 do not use matching protocols in order to contrast with the grouping of the two other SIMs. However, if the technology of SIM3 and SIM4 were matched, then further overhead reductions may be achieved.

Consider an example scenario where SIM1 and SIM2 both use GSM and SIM3 and SIM4 both use CDMA. By grouping SIM1 and SIM2 on one RF chain and SIM3 and SIM4 on the other RF chain overhead may be reduced. The matching communication protocols may include at least one of LTE, GSM, GPRS, EDGE, UMTS, GRAN, 1×/DO, WCDMA and CDMA. Thus, this type of protocol matching of SIMs may substantially reduce the power and time overheads involved in a quad SIM mobile communication devices.

Figure 7:
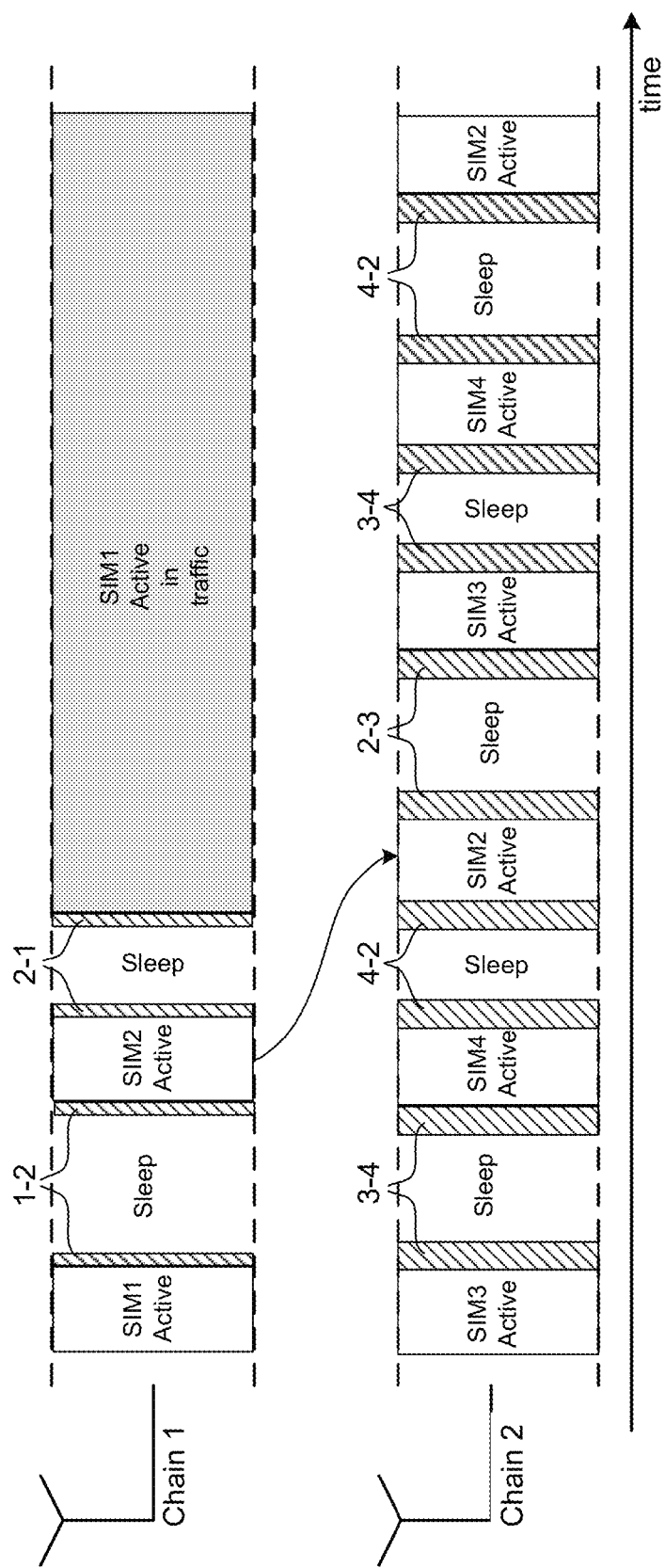
FIG. 7 is another sequence architecture diagram illustrating overhead costs associated with the operation of two RF chains with a subscription entering a traffic state, suitable for use in the various embodiments.

FIG. 7 shows a further example of how certain embodiments may be combined. Initially along the time-line, RF chain 1 and RF chain 2 start off in a similar configuration to that shown in FIG. 6, with similar matching technologies found between SIM1 and SIM2, but not SIM3 and SIM4. Both FIG. 6 and the initial part of the time-line of FIG. 7 have all SIMs active in slotted idle states. However, FIG. 7 shows SIM1 enter a dedicated traffic state at a later point in time, similar to what is described above with reference to FIGS. 2 and 3. Thus, rather than allowing SIM2 to enter an out-of-service state, it may be switched (along with its subscription) over to RF chain 2 in a slotted idle state along with the third and fourth subscriptions. As noted above, in the idle states the second, third and fourth subscriptions are able to monitor pages in their respective paging channel slots.

Figure 8:
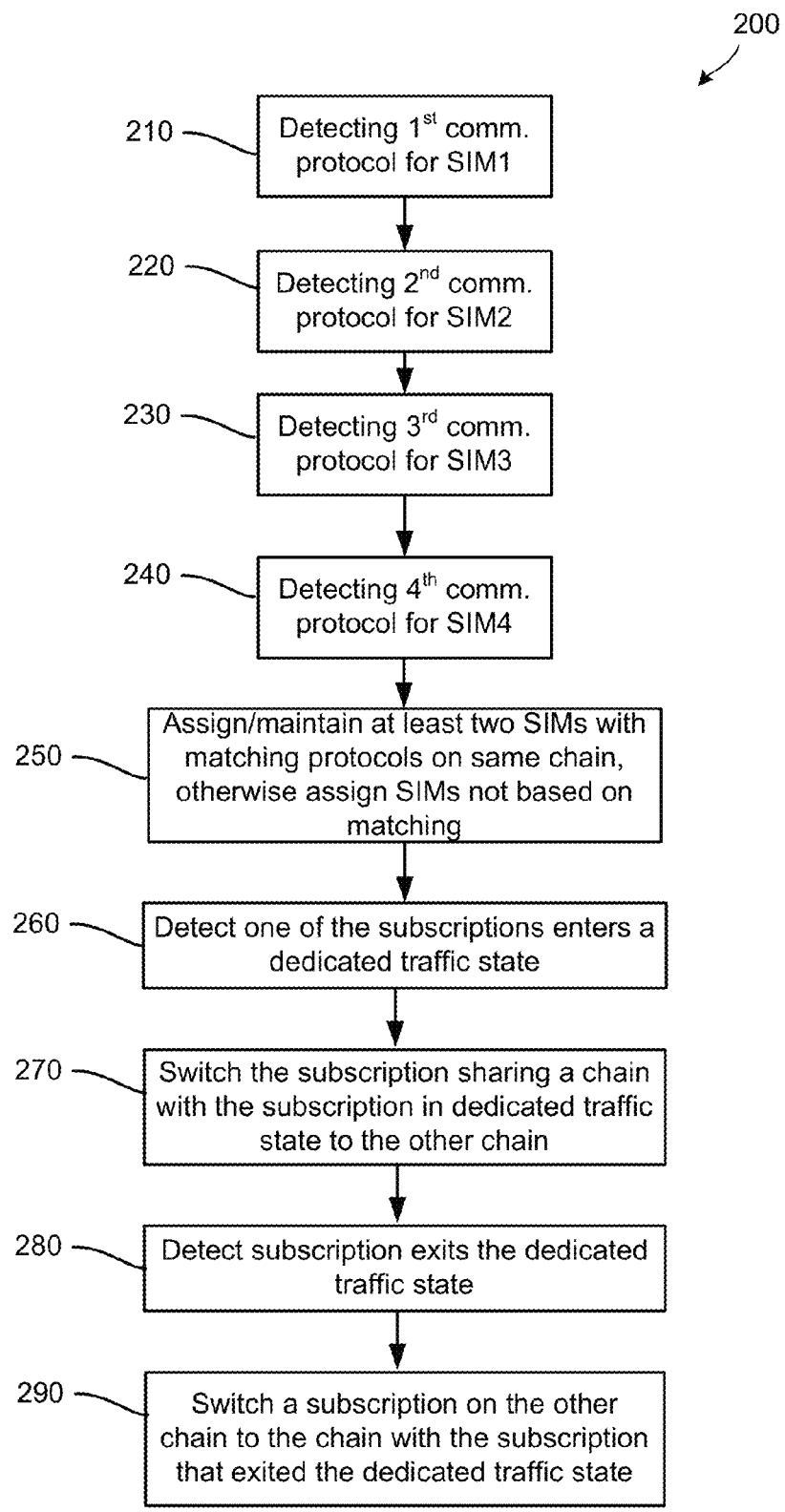
FIG. 8 is a process flow diagram illustrating an embodiment method of managing quad SIM functionality on a mobile device in accordance with an embodiment.

FIG. 8 illustrates a method 200 of managing quad SIM functionality on a mobile device in accordance with an embodiment. In block 210 the communication protocol for a first one of the SIMs (SIM1) is detected. Similarly, in blocks 220, 230 and 240, respectively, the communication protocols for SIM2, SIM3 and SIM4 are detected. As an alternative, once two SIMs are matched, meaning they use similar communication protocols, those two may be paired and the communication protocols of any remaining SIMs need not be detected. In block 250 the SIMs may be paired-up and assigned to RF chains. If two of the protocols in blocks 210-240 match, then those two SIMs are said to match and may be assigned and maintained for some time to a common RF chain. Otherwise, if no match is found, then the SIMs may be assigned and maintained on the RF chains based on something other than their protocols, such as the order in which they are detected or their respective locations within the mobile device.

In block 260 one of the subscriptions may be detected as entering a dedicated traffic state. For example, one of the four SIM cards in the quad SIM device starts carrying voice traffic. In block 270 the subscription sharing an RF chain with the subscription detected in block 260 as being in dedicated traffic state may be switched to the other RF chain. For example, if a subscription on RF chain 1 is detected as entering a dedicated traffic state, then the other subscription on RF chain 1 would be switched to RF chain 2. In block 280 a subscription is detected to have exited the dedicated traffic state, such as returning to an idle state. For example, this may be the subscription previously detected in block 260 as having entered a dedicated traffic state. With one RF chain carrying a subscription not in a dedicated traffic state, in block 290 one of the subscriptions on the other RF chain may be switched to that one RF chain. For example, this could be the subscription switched in block 270 or it could be one of the other subscriptions maintained on that other RF chain.

Figure 9:
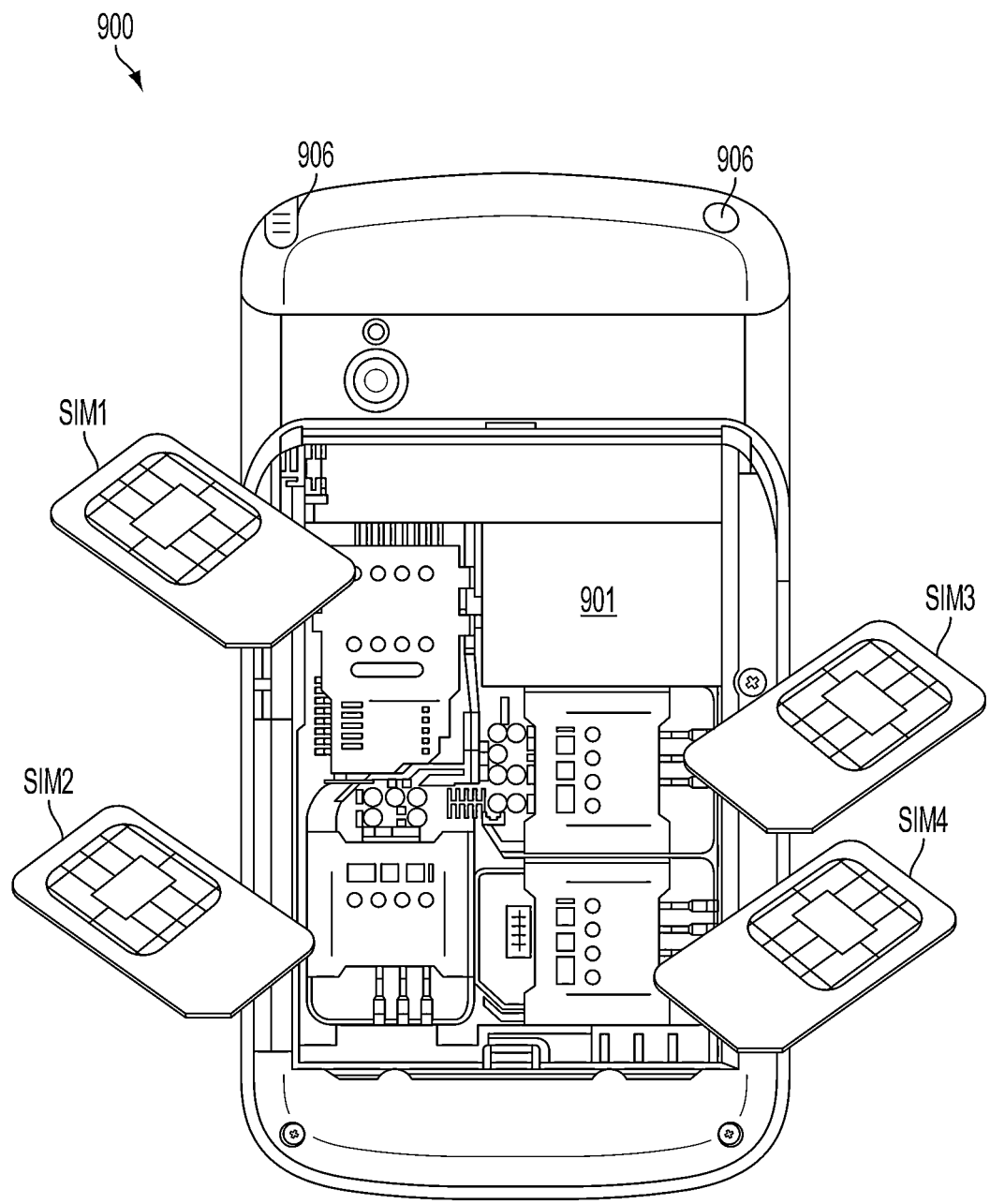
FIG. 9 is an illustration of a quad SIM mobile device in the form of a cellular telephone suitable for implementing the various embodiments.

The various embodiments may be implemented in and/or with any of a variety of computing devices, such as a mobile telephone, a further example of which is illustrated in FIG. 9 in the form of a cellular telephone with a back panel removed. Typical mobile communication devices will have in common the components illustrated in FIG. 9. For example, mobile communication devices 900 may include a processor 901 coupled to an internal memory and a touch surface input device/display (one reverse side), such as a resistive sensing touch-screen, capacitive sensing touch-screen, infrared sensing touch-screen, acoustic/piezoelectric sensing touch-screen, or the like. The mobile communication device 900 may have two radios/antennas 906 for sending and receiving data that are connected to wireless data links and/or cellular telephone transceivers coupled to the processor 901. Mobile computing devices 900 may also include a GPS receiver coupled to the processor 901 for determining locations of the device. Additionally, the illustrated mobile communication device 900 is a quad SIM device that includes four SIM cards, SIM1, SIM2, SIM3 and SIM4. These SIM cards are also coupled to the processor 901 for operatively switching SIM cards for use on either one of the radios/antennas 906, as described further above. Alternatively, the SIMs need not be four separate and distinct physical cards, but may be defined by software code within the mobile communication device 900, whether physically removable or otherwise reprogrammable.

Figure 10:
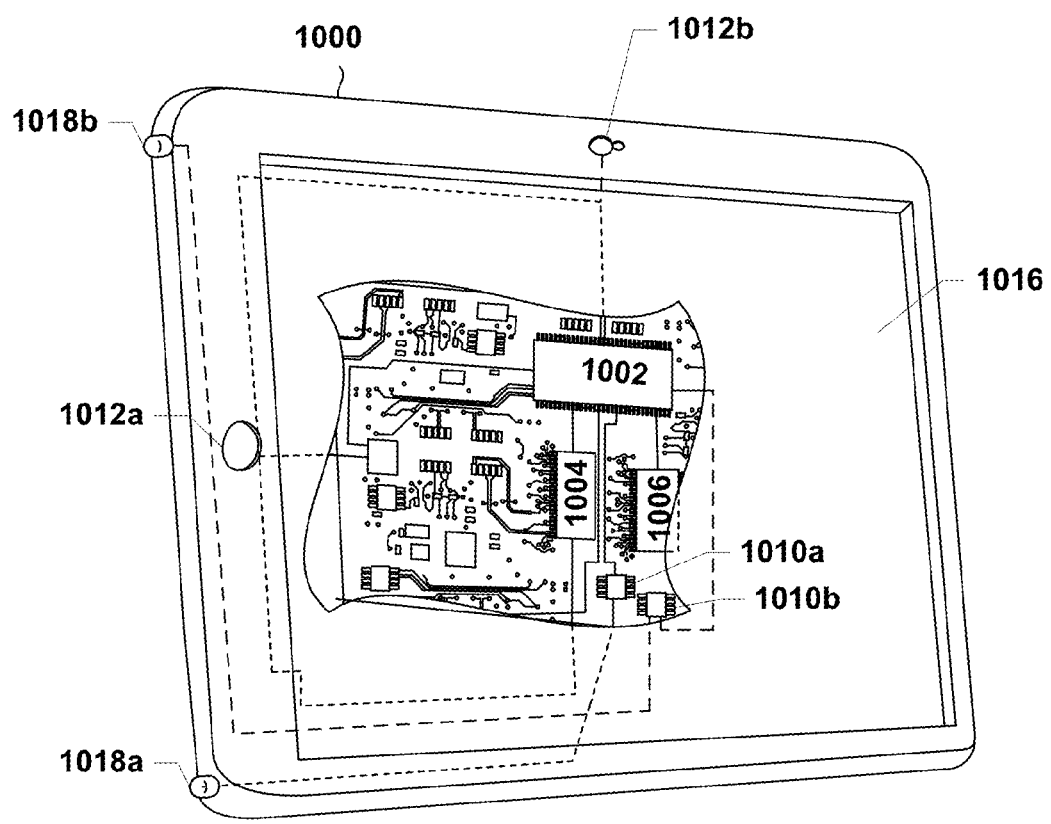
FIG. 10 is an illustration of a quad SIM mobile device in the form of a tablet computer suitable for implementing the various embodiments.

The various embodiments may be implemented in and/or with any of a variety of computing devices, such as a tablet computer, an example of which is illustrated in FIG. 10. For example, the mobile communication device 1000 may include a processor 1002 coupled to internal memories 1004 and 1006. Internal memories 1004 and 1006 may be volatile or non-volatile memories, and may also be secure and/or encrypted memories, or unsecure and/or unencrypted memories, or any combination thereof. The processor 1002 may also be coupled to a user interface, such as a touch screen display 1016 (e.g., a resistive-sensing touch screen, capacitive-sensing touch screen infrared sensing touch screen, or the like), or conventional buttons (e.g., 1012a and 1012b) and a non-touch screen display. Additionally, the mobile communication device 1000 may include multiple network transceivers configured to enable the processor 1002 to communicate with other computing devices over one or more wired or wireless networks, in accordance with the disclose embodiments. As a particular example, the network transceivers 1010a, 1010b of a mobile communication device 1000 may include two antenna 1018a, 1018b for sending and receiving electromagnetic radiation that may be connected to one or more wireless data link transceivers and/or network transceivers 1010a, 1010b coupled to the processor 1002. The mobile communication device 1000 may also include physical buttons 1012a and 1012b for receiving user inputs. Embedded within the device are the quad SIM devices, which are in-turn operatively coupled to the processor 1002.

The various embodiments may also be implemented in and/or with any of a variety of commercially available electronic devices. Such a laptop computer, which typically includes a processor coupled to volatile memory and a large capacity nonvolatile memory, such as a disk drive. The computer may also include a floppy disc drive, compact disc (CD) or DVD disc drive coupled to the processor. The computer may also include network access ports and antennas coupled to the processor for establishing network interface connections with a network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors in the various embodiments described herein may be any programmable microprocessor, microcomputer or multiple processor chip or chips that can be configured by software instructions (applications/programs) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the processor-executable software instructions. In many devices the internal memory may be a volatile or nonvolatile memory, such as flash memory, or a mixture of both. For the purposes of this description, a general reference to memory refers to memory accessible by the processors including internal memory or removable memory plugged into the device and memory within the processor themselves.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. The word "exemplary" is used herein to mean "serving as an example, instance, or illustration." Any implementation described herein as "exemplary" is not necessarily to be construed as preferred or advantageous over other implementations.

The various illustrative logical blocks, modules, circuits, and process flow diagram blocks described in connection with the embodiments may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing multi-subscriber identity/identification module (multi-SIM) functionality on a mobile device, comprising:
    maintaining active in first slotted idle states a first subscription and a second subscription on a first radio frequency (RF) chain of the mobile device, the first subscription associated with a first SIM and the second subscription associated with a second SIM;
    maintaining active in second slotted idle states a third subscription and a fourth subscription on a second RF chain of the mobile device, the third subscription associated with a third SIM and the fourth subscription associated with a fourth SIM, wherein in the first slotted idle states and the second slotted idle states the first, second, third and fourth subscriptions monitor pages in respective ones of paging channel slots; and
    switching the third subscription to the first RF chain in response to the fourth subscription entering a dedicated traffic state, wherein the first subscription, the second subscription, and the third subscription remain active monitoring pages in the respective ones of the paging channel slots on the first RF chain when the third subscription is switched to the first RF chain.

2. The method of claim 1, further comprising:
    switching the third subscription to the second RF chain in response to the fourth subscription leaving the dedicated traffic state.

3. A computing device, comprising:
    a processor coupled to a first radio frequency (RF) chain, a second RF chain, and a first, second, third, and fourth subscriber identity/identification module (SIM), the processor configured with processor-executable instructions to:
        maintain active in first slotted idle states a first subscription and a second subscription on the RF chain, the first subscription associated with the first SIM and the second subscription associated with the second SIM;

maintain active in second slotted idle states a third subscription and a fourth subscription on the second RF chain, the third subscription associated with the third SIM and the fourth subscription associated with the fourth SIM, wherein in the first and second slotted idle states the first, second, third and fourth subscriptions monitor pages in respective ones of paging channel slots; and switch the third subscription to the first RF chain in response to the fourth subscription entering a dedicated traffic state, wherein the first subscription, the second subscription, and the third subscription remain active monitoring pages in the respective ones of the paging channel slots on the first RF chain when the third subscription is switched to the first RF chain.

4. The computing device of claim 3, wherein the processor is further configured with processor-executable instructions to:

switch the third subscription to the second RF chain in response to the fourth subscription leaving the dedicated traffic state.

5. A multi-subscriber identity/identification module (multi-SIM) computing device, comprising:

means for maintaining active in first slotted idle states a first subscription and a second subscription on a first radio frequency (RF) chain, the first subscription associated with a first SIM and the second subscription associated with a second SIM;

means for maintaining active in second slotted idle states a third subscription and a fourth subscription on a second RF chain, the third subscription associated with a third SIM and the fourth subscription associated with a fourth SIM, wherein in the first and second slotted idle states the first, second, third and fourth subscriptions monitor pages in respective ones of paging channel slots; and means for switching the third subscription to the first RF chain in response to the fourth subscription entering a dedicated traffic state, wherein the first subscription, the second subscription, and the third subscription remain active monitoring pages in the respective ones of the paging channel slots on the first RF chain when the third subscription is switched to the first RF chain.

6. The multi-SIM computing device of claim 5, further comprising:

means for switching the third subscription to the second RF chain in response to the fourth subscription leaving the dedicated traffic state.

7. A non-transitory computer readable storage medium having stored thereon processor-executable software instructions configured to cause a processor of a multi-subscriber identity/identification module (multi-SIM) mobile device to perform operations comprising:

maintaining active in first slotted idle states a first subscription and a second subscription on a first radio frequency (RF) chain of the multi-SIM mobile device, the first subscription associated with a first SIM and the second subscription associated with a second SIM;

maintaining active in second slotted idle states a third subscription and a fourth subscription on a second RF chain of the multi-SIM mobile device, the third subscription associated with a third SIM and the fourth subscription associated with a fourth SIM, wherein in the first and second slotted idle states the first, second, third and fourth subscriptions monitor pages in respective ones of paging channel slots; and switching the third subscription to the first RF chain in response to the fourth subscription entering a dedicated traffic state, wherein the first subscription, the second subscription, and the third subscription remain active monitoring pages in the respective ones of the paging channel slots on the first RF chain when the third subscription is switched to the first RF chain.

8. The non-transitory computer readable storage medium of claim 7, wherein the stored processor-executable instructions are configured to cause the processor of the multi-SIM mobile device to perform operations further comprising:

switching the third subscription to the second RF chain in response to the fourth subscription leaving the dedicated traffic state.

\* \* \* \* \*